United States Patent
Nagai et al.

(10) Patent No.: US 7,109,843 B2
(45) Date of Patent: Sep. 19, 2006

(54) REMOTE CONTROL SYSTEM FOR CONTROLLING A VEHICLE WITH PRIORITY OF CONTROL ACCESS BEING ASSIGNED TO THE MOST RECENT USER OF THE VEHICLE

(75) Inventors: Nobuyoshi Nagai, Kariya (JP); Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 130 days.

(21) Appl. No.: 10/640,644

(22) Filed: Aug. 14, 2003

(65) Prior Publication Data
US 2004/0085189 A1  May 6, 2004

(30) Foreign Application Priority Data
Oct. 30, 2002  (JP) .............................. 2002-316365

(51) Int. Cl.
B60R 25/00 (2006.01)
B60R 25/04 (2006.01)
G06F 7/04 (2006.01)

(52) U.S. Cl. .................... 340/5.72; 340/5.61; 307/10.5
(58) Field of Classification Search ............... 340/5.72, 340/5.62, 10.2
See application file for complete search history.

(56) References Cited

U.S. PATENT DOCUMENTS

| | | | | |
|---|---|---|---|---|
| 4,794,268 A | * | 12/1988 | Nakano et al. ............. | 340/5.72 |
| 5,838,257 A | * | 11/1998 | Lambropoulos ........... | 340/5.72 |
| 5,983,347 A | * | 11/1999 | Brinkmeyer et al. ....... | 340/5.62 |
| 6,552,649 B1 | * | 4/2003 | Okada et al. .............. | 340/5.72 |
| 6,621,406 B1 | * | 9/2003 | Kumano ..................... | 340/5.72 |
| 6,768,413 B1 | * | 7/2004 | Kemmann et al. ......... | 340/5.72 |
| 2002/0030586 A1 | * | 3/2002 | Katou et al. ............... | 340/5.72 |

FOREIGN PATENT DOCUMENTS

| | | |
|---|---|---|
| JP | 10-100862 | 4/1998 |
| JP | 2000-104429 | 4/2000 |
| JP | 2002-188340 | 7/2002 |
| KR | 1998-71923 | 10/1998 |

* cited by examiner

*Primary Examiner*—Brian Zimmerman
*Assistant Examiner*—Clara Yang
(74) *Attorney, Agent, or Firm*—Posz Law Group, PLC

(57) ABSTRACT

A vehicle remote control system in which a plurality of users carry respective electronic keys that are assigned respective ID codes, for communicating with a vehicle-mounted control apparatus that periodically transmits a calling code followed by the ID codes in succession, in which an electronic key that is within communication range responds to its specific ID code by transmitting response data to the vehicle-mounted apparatus for thereby initiating a control operation, and in which when an electronic key responds, the corresponding ID code is made the first in the sequence of ID codes when the calling code and ID codes are next transmitted.

14 Claims, 7 Drawing Sheets

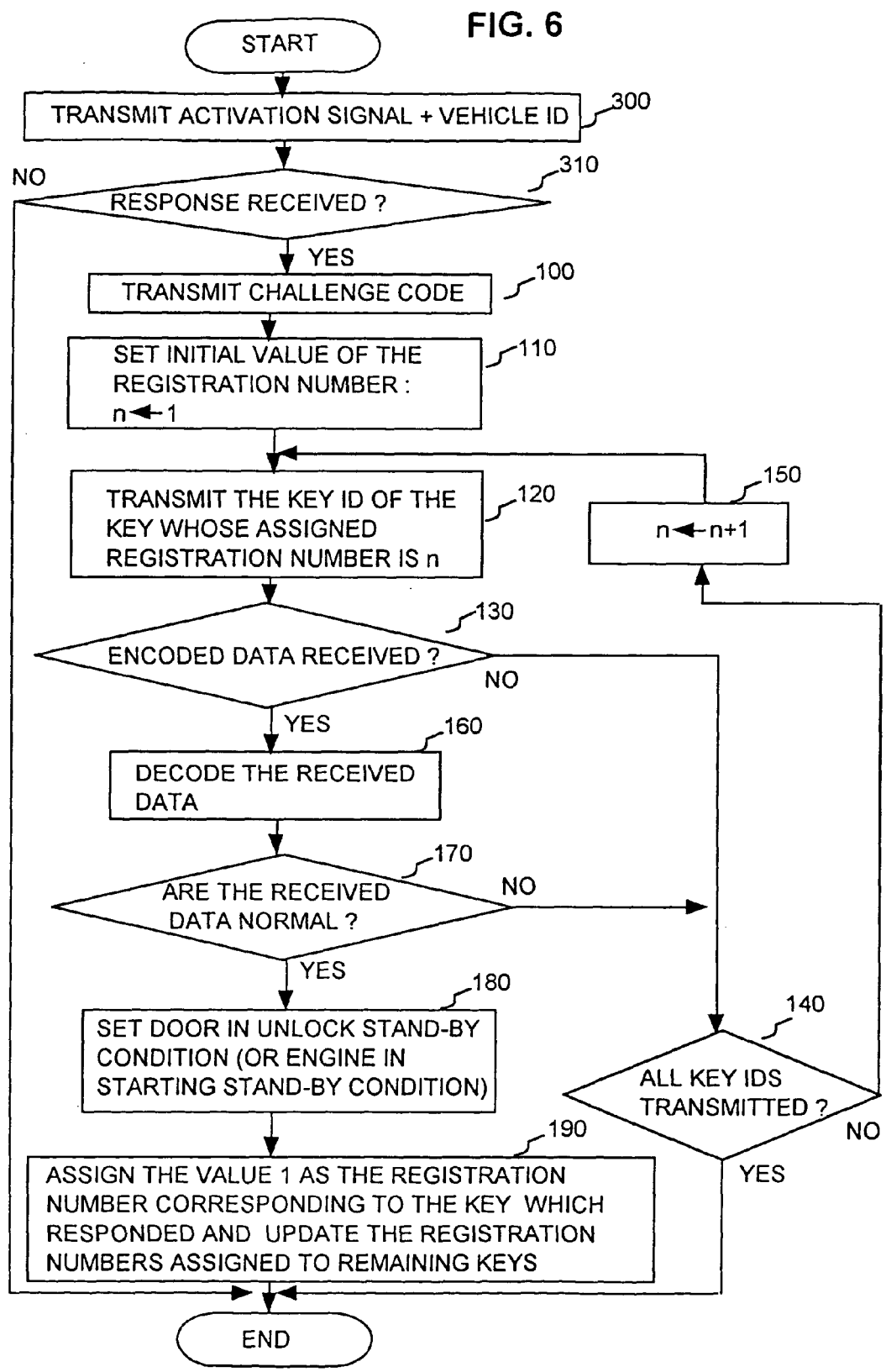

REMOTE CONTROL SYSTEM FOR CONTROLLING A VEHICLE WITH PRIORITY OF CONTROL ACCESS BEING ASSIGNED TO THE MOST RECENT USER OF THE VEHICLE

BACKGROUND OF THE INVENTION

1. Field of Application

The present invention relates to a remote control system for a vehicle, the apparatus including a vehicle-mounted control apparatus which effects control of one or more controlled devices of the vehicle based on wireless communication with one or more portable devices.

2. Description of Related Art

In the prior art, types of remote control system for a vehicle are known whereby, when the vehicle is parked with the doors locked, a vehicle-mounted control apparatus of the remote control system periodically transmits a calling code within a predetermined region around the vehicle, using a wireless communication technology. In the following, the term "radio waves" is used for convenience to refer to wireless communication media in general, such as light waves or radio-frequency electromagnetic waves, and a vehicle which carries a vehicle-mounted control apparatus of a remote control system which is being described will be referred to as the host vehicle. If a portable apparatus which is carried by a user of that vehicle and is configured for wireless communication with the vehicle-mounted control apparatus is located within communication range of the host vehicle, then that portable apparatus transmits predetermined response data upon receiving the calling code. When the response data are received by the vehicle-mounted control apparatus, that apparatus effects control whereby the lock of a door of the vehicle is released, or whereby that lock is set in a stand-by condition whereby it can be manually unlocked. Such a remote control system is sometimes referred to as a "smart entry system".

With one type of such a system, as described in Japanese Patent No. 2000-104429, the system monitors the calling code and the response data which are exchanged between the vehicle-mounted control apparatus and the portable apparatuses, to ensure that these data will not be improperly used. Specifically, the vehicle-mounted control apparatus transmits the calling code as modulated radio waves in the form of a variable code which is known as a challenge code, and is used as an encoding key. When a portable apparatus assigned to that vehicle receives the challenge code, it encodes the response data by using the challenge code contents as an encoding key, and transmits the resultant encoded response data.

A type of portable apparatus used as described above is generally referred to as an electronic key, and a plurality of individuals may have respective electronic keys that are assigned to the same vehicle. For that reason, with a prior art type of remote control system as described above, when a plurality of individuals are adjacent to a vehicle with each of these individuals carrying an electronic key that is assigned to that vehicle (or an individual who is carrying a plurality of such electronic keys is close to the vehicle), then when these electronic keys respond to the calling code that is transmitted from the vehicle-mounted control apparatus of the remote control system, a plurality of sets of encoded response data will be transmitted concurrently from the respective electronic keys. Hence, the problem arises that the vehicle-mounted control apparatus may be unable to distinguish between the respective sets of response data from the various electronic keys, so that it may become unable to effect the desired control operation, such as unlocking a door.

To try to overcome this problem, a method might be envisaged whereby after the vehicle-mounted control apparatus has completed transmitting the calling code (i.e., which may include a challenge code), it transmits a number of successive bursts of radio waves, with the number of bursts being identical to the total number of electronic keys which are assigned to the vehicle. Each of these electronic keys would be assigned respective burst numbers, and when an electronic key receives a number of successive bursts which reach the number that is assigned to that key, then that electronic key (and only that key) would transmit response data.

With such a remote control system, even if a plurality of the electronic keys were located concurrently in close proximity to the corresponding vehicle, the vehicle-mounted control apparatus would respond only to the response data that are transmitted from a single one of these electronic keys, i.e., the electronic key which is the first to transmit response data after the vehicle-mounted control apparatus has transmitted the calling code. It would appear that such a system would provide reliable communication, even when a plurality of electronic keys are simultaneously located close to the corresponding vehicle.

However with such a system, the individual who carries the electronic key that has been assigned the largest burst number (e.g., when that individual is close to the vehicle and wishes to access the vehicle) must always wait until the vehicle-mounted control apparatus has completed transmitting the maximum number of bursts of radio waves, before being able to access the vehicle. Depending upon the number of electronic keys that are assigned to that vehicle, this may result in a significant delay between the time at which a user approaches the vehicle and the time at which access can be obtained (i.e., a door lock is released or is set in the unlock stand-by condition), which can cause dissatisfaction of the users of such a system. This is a basic problem of such a system.

SUMMARY OF THE INVENTION

It is an objective of the present invention to overcome the problems described above, by providing a remote control system in which a controlled device of a vehicle is controlled by a vehicle-mounted control apparatus based on response data that are transmitted from a portable apparatus, whereby even if a calling code that is transmitted by the vehicle-mounted control apparatus is received by a plurality of portable apparatuses which are located adjacent to the vehicle, the controlled device is reliably controlled without a delay in response.

To achieve the above objectives, according to a first aspect, the invention provides a remote control system whereby when a vehicle-mounted control apparatus calls a portable apparatus, a calling means of the vehicle-mounted control apparatus supplies a portable apparatus calling code and respective ID (identification) codes for respective ones of a plurality of portable apparatuses to a transmitting means, to be successively transmitted by the transmitting means.

When a portable apparatus receives such transmitted data from the vehicle-mounted control apparatus, and judges that a point has been reached in the transmitting of successive ID codes at which the specific ID code assigned to that portable apparatus has been transmitted, then that specific portable apparatus transmits predetermined response data, to be received by the vehicle-mounted control apparatus. Thus, when there are a plurality of the portable apparatuses assigned to such a vehicle, which are located concurrently within a communication region of that vehicle, there is no possibility that a plurality of these portable apparatuses will simultaneously transmit response data in response to the calling code which is transmitted from the vehicle-mounted control apparatus, i.e., response data will be received by the vehicle-mounted control apparatus from only a single one of the portable apparatuses.

This is of course the same advantage as described hereinabove for the prior art method of simply transmitting successive bursts of radio waves, with respective burst numbers being assigned to the various electronic keys. However with the present invention, the vehicle-mounted control apparatus is configured such as to assign varying degrees of priority to the order in which the ID codes of the respective portable apparatuses are transmitted. Specifically, when the vehicle-mounted control apparatus transmits the calling code, the portable apparatus which responds to that occurrence of transmitting the calling code (i.e., if there are a plurality of the portable apparatuses within the communication region of the vehicle, the first of these to transmit a response) is allocated the highest priority for the next occurrence of transmitting the calling code. That is to say, after the calling code is next transmitted by the vehicle-mounted control apparatus, the ID code of the portable apparatus which was the most recent to have responded to the calling code is transmitted as the first of the succession of ID codes.

Thus, when an individual uses a portable apparatus to access the vehicle with such a system, it is ensured that when that same individual is the next person to subsequently access the vehicle, the ID code of the portable apparatus of that individual will be transmitted first in the sequence, so that there is a minimum of delay in control response. In that way, efficiency of operation with improved response speed is attained, since in general there is a high probability that the individual who accesses the vehicle by using the remote control system on any particular occasion will be the same individual who most recently accessed the vehicle.

A further aspect of the invention is as follows. In the prior art, when the vehicle-mounted control apparatus transmits the calling code (e.g., at fixed periodic intervals), there is no way in which the vehicle-mounted control apparatus can reliably distinguish between response data which originated from an appropriate source (i.e., an electronic key which is assigned to a valid user of the host vehicle) and data transmitted from some other source, e.g., as can occur when the response data are stolen, and are then used by an unauthorized individual to attempt to access the host vehicle. For that reason, according to a second aspect of the invention, the calling code which is transmitted by the vehicle-mounted control apparatus includes a variable code which is for use as an encoding key. When a portable apparatus receives this calling code, then before transmitting response data, the response data are encoded by using the variable code contained in the calling code. The vehicle-mounted control apparatus includes means for decoding the resultant received encoded response data when these are received by the signal receiving means of the vehicle-mounted control apparatus, with the same variable code being used to perform this decoding. The vehicle-mounted control apparatus then judges whether or not the response data have been received from an appropriate portable apparatus, based on whether or not the results of decoding the response data are correct (i.e., are in accordance with predetermined conditions). Since the encoding key is a variable code (e.g., which can be changed each time that the calling code is transmitted), stolen response data cannot be used to achieve unauthorized entry to the host vehicle.

In that way, the remote control system can obtain information for use in preventing improper use of that vehicle, and thereby enhancing vehicle security.

With such a system, the calling code will in general be periodically transmitted, with a fixed period, e.g., with such transmissions beginning automatically when the vehicle engine is switched off and being terminated only when a specific operation such as restarting the engine is subsequently performed. However if this is done, and the vehicle is left parked for a long period of time while such periodic transmissions of the calling code occur, then this may result in an excessive drain on the capacity of the vehicle battery, which may become discharged. In that case, all of the electrical equipment of the vehicle will become inoperable. To overcome this problem, according to a third aspect of the invention, the vehicle-mounted control apparatus includes an operating switch which must be manually actuated by a user of the vehicle in order to start the periodic transmissions of the calling code. In that way, by leaving the calling code transmission function in a deactivated status when it is known that the vehicle will be left parked for a long period of time, the user can avoid the possibility of the vehicle battery becoming discharged.

As a further measure to reduce the level of battery power consumption by the remote control system, according to a fourth aspect of the invention, the vehicle-mounted control apparatus is configured to transmit an activation signal before transmitting the calling code. Specifically, the calling code is then transmitted only if a confirmation signal is received from a portable apparatus in response to the activation signal. That is to say, each portable apparatus is configured to respond to reception of the activation signal by transmitting a confirmation signal, which is preferably made common to all of the portable apparatuses that are assigned to the vehicle. When the vehicle-mounted control apparatus receives the confirmation signal (i.e., from one or more portable apparatuses that are within the communication area of that vehicle) then it transmits the calling code as described above.

In that way, it is ensured that when there is no portable apparatus within the communication region of the vehicle-mounted control apparatus, only the activation signal will be periodically transmitted by the vehicle-mounted control apparatus. Since the calling code (e.g., including the challenge code and the sequence of ID codes of the respective portable apparatuses assigned to the vehicle) will not be periodically transmitted in such a case, the drain on the vehicle battery due to operation of the remote control system is significantly reduced.

Furthermore, when such a method of using an activation signal is employed in conjunction with the aforementioned measure of providing an operating switch that is actuatable by a user, i.e., whereby the periodic transmissions of the activation signal can be halted if the vehicle is to be parked for a long period of time, the level of battery power consumption can be further reduced.

Furthermore, with this fourth aspect of the invention, when one or more portable apparatuses receive the activation signal and transmit the confirmation signal, the same confirmation signal is transmitted by all of these portable apparatuses. The advantage of this is as follows. If respectively different confirmation signals were to be transmitted by various portable apparatuses that receive the activation signal concurrently, the vehicle-mounted control apparatus would be unable to distinguish between these various confirmation signals. However if all of these portable apparatuses transmit the same confirmation signal in common, the vehicle-mounted control apparatus will be able to reliably receive the confirmation signal and so proceed to the operation of transmitting the calling code followed by the succession of ID codes of the respective portable apparatuses.

In a practical implementation of a remote control system configured in accordance with the fourth aspect of the invention, it is preferable that the activation signal that is transmitted by the vehicle-mounted control apparatus includes a vehicle ID code which is specific to the host vehicle, and that each of the portable apparatuses that are assigned to that host vehicle have that vehicle ID code recorded therein beforehand, with each of the portable apparatuses being configured to transmit the confirmation signal only in response to an activation signal which includes the vehicle ID code of the host vehicle corresponding to that portable apparatus.

In addition, the confirmation signal preferably consists of a predetermined fixed code which is specific to, and is used in common by, all of the portable apparatuses that are assigned to the host vehicle, rather than a simple burst (or series of bursts) of unmodulated radio waves. This is due to the fact that if the confirmation signal consisted only of bursts of radio waves, then the vehicle-mounted control apparatus might erroneously detect signals that are transmitted from other types of portable apparatus, or electrical noise that is generated in the vicinity of the vehicle, as being a confirmation signal, and so might erroneously transmit the calling code and the sequence of portable apparatus ID codes. However if a fixed code is used as the confirmation signal, the vehicle-mounted control apparatus can reliably detect a confirmation signal that is transmitted from a portable apparatus that is assigned to the host vehicle, so that unnecessary transmissions of the calling code and the sequence of portable apparatus ID codes can be prevented.

BRIEF DESCRIPTION OF THE DRAWINGS

FIG. 6 is a flow diagram for describing electronic key detection processing which is executed by a smart entry control ECU of the alternative configuration of the embodiment.

DESCRIPTION OF PREFERRED EMBODIMENTS

Figure 1:
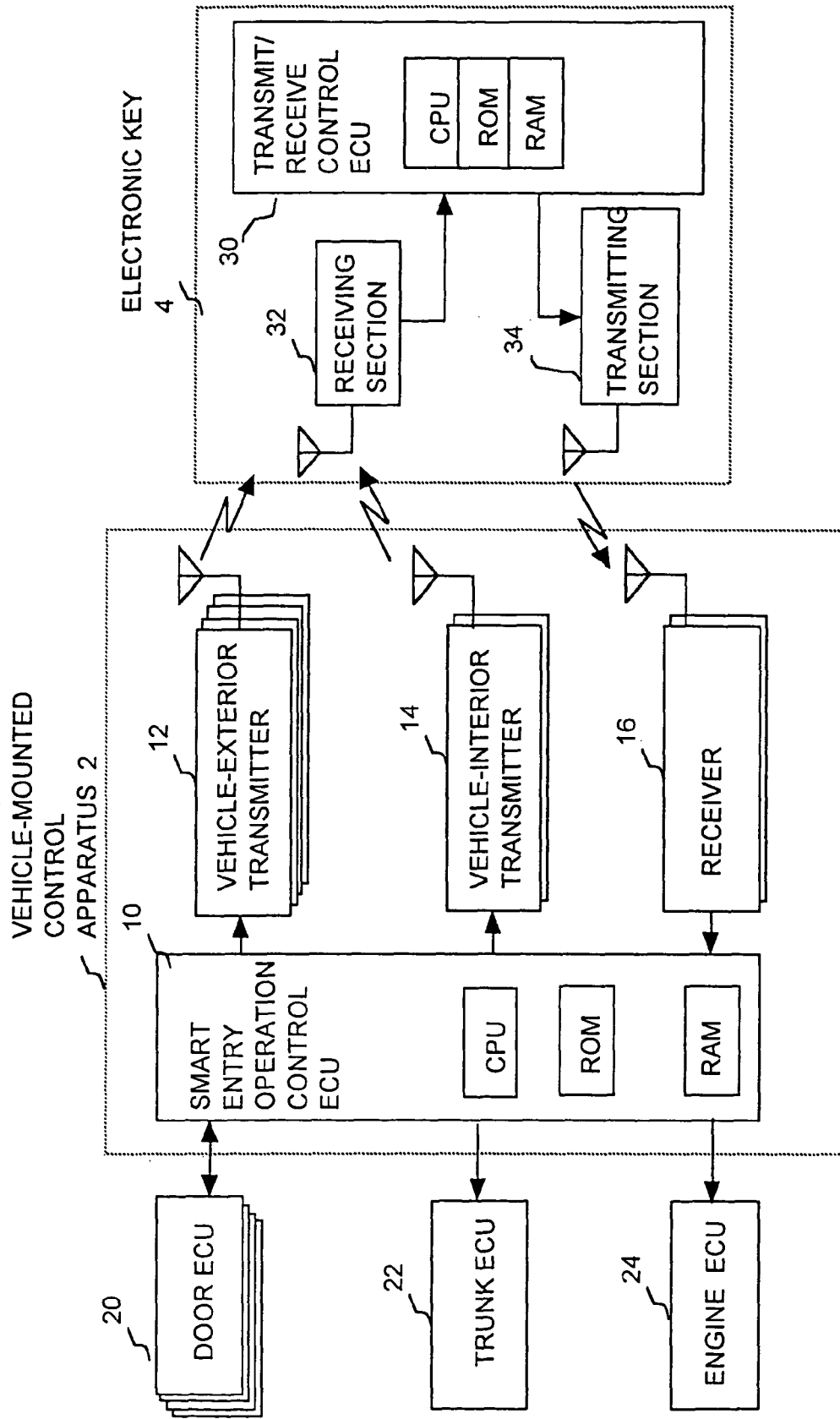
FIG. 1 is a system block diagram showing the overall configuration of an embodiment of a smart entry system.

FIG. 1 is a system block diagram of an embodiment of a smart entry system according to the present invention. The system is formed of a vehicle-mounted control apparatus 2 which is mounted on the host vehicle, and a plurality of portable apparatuses constituted by respective electronic keys 4 that are assigned to the host vehicle and are carried by users of the host vehicle (with only a single electronic key 4 being shown in the drawing).

Each electronic key 4 is configured for transmitting and receiving data by modulated radio waves, for communication with the vehicle-mounted control apparatus 2, and is made up of a receiving section 32 which receives transmitted radio waves from the vehicle-mounted control apparatus 2 via a receiving antenna of the electronic key 4 and demodulates the received data, a transmit/receive control ECU 30 which generates data for responding to the vehicle-mounted control apparatus 2 based upon the data that are demodulated by the receiving section 32, and a transmitting section 34 which applies the data produced from the transmit/receive control ECU 30 to modulate a carrier wave within a predetermined radio frequency band (e.g., several hundred MHz) to thereby produce a transmission signal that is transmitted to the vehicle-mounted control apparatus 2 from a transmitting antenna of the electronic key 4.

The transmit/receive control ECU 30 is based on a CPU, ROM, RAM, etc., of a microcomputer.

The vehicle-mounted control apparatus 2 is made up of a smart entry operation control ECU 10 which (like the transmit/receive control ECU 30) is based on a CPU, ROM, RAM, etc., of a microcomputer, a vehicle-exterior transmitter 12 for transmitting data to any electronic key 4 which may be within a communication region around the periphery of the host vehicle, a vehicle-interior transmitter 14 for transmitting data to any electronic key 4 which is within a communication region in the interior (i.e., in the passenger compartment) of the host vehicle (although in practice, the transmitters 12 and 14 may be implemented as respective pluralities of transmitters as described in the following), and a receiver (or plurality of receivers) 16 for receiving data that are transmitted from an electronic key 4. The vehicle-exterior transmitter(s) 12, vehicle-interior transmitter(s) 14 and receiver(s) 16 constitute a communication section of the vehicle-mounted control apparatus 2.

Figure 2:
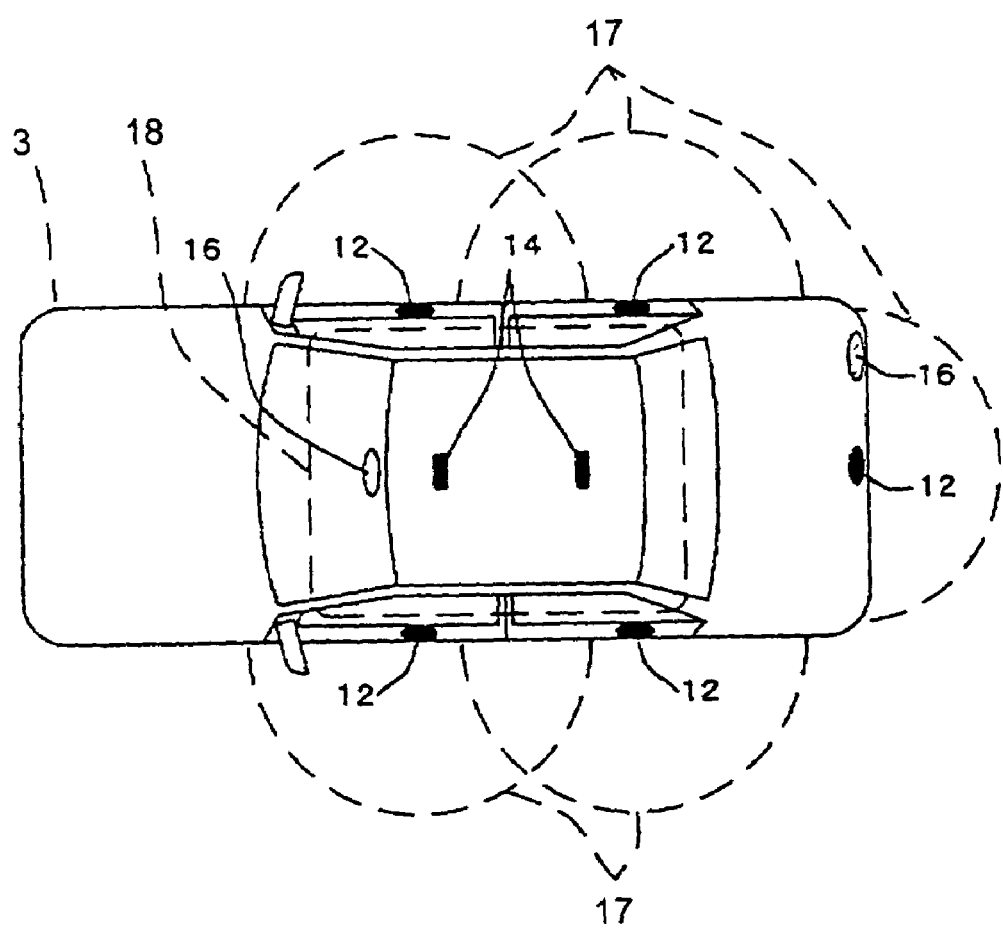
FIG. 2 is a conceptual plan view of a vehicle for illustrating a distribution of communication regions in and around the vehicle.

FIG. 2 is a conceptual plan view of the host vehicle, designated by numeral 3, for illustrating the spatial relationships between a set of vehicle-exterior transmitters 12, a pair of vehicle-interior transmitters 14 and a pair of receivers 16, and communication regions of the host vehicle 3. As shown in FIG. 2, the vehicle-exterior transmitters 12 are provided on the driver side door, the front passenger side door, the left-side passenger rear door, and the right-side passenger rear door, and also on the trunk lid of the host vehicle 3. A set of communication regions centered on respective ones of the vehicle-exterior transmitters 12 are thereby formed around the periphery of the vehicle 3, with these being referred to collectively in the following as the vehicle-exterior communication region 17. The vehicle-interior transmitters 14 are disposed approximately centrally within the passenger compartment of the host vehicle 3, to form a communication region 18 in the interior of the vehicle. The receivers 16 in this example are provided on the rear mirror, in front of the driver, to receive signals from any electronic key 4 that is within the passenger compartment, and on the trunk lid of the host vehicle 3 to receive signals from any electronic key 4 that is within the communication region 17 external to the vehicle.

The transmitters 12 and 14 each transmit a signal formed by applying the output data from the smart entry operation control ECU 10 to modulate a carrier wave having a frequency in the range of several hundred MHz, for example. Each receiver 16 demodulates any signal received at its antenna, and supplies the resultant demodulated data to the smart entry operation control ECU 10.

When the host vehicle is in a parked condition with all of the doors locked, if the smart entry operation control ECU 10 receives data from the receiver 16 (in response to signals transmitted from the vehicle-exterior transmitters 12) indicating that there is an electronic key 4 located near the periphery of the host vehicle, then the smart entry operation control ECU 10 applies control whereby the door ECU 20 and the trunk ECU 22 are each set in the unlock stand-by condition. If a door lock has been released, and the host vehicle is parked with the engine halted, then when the smart entry operation control ECU 10 detects that there is an electronic key 4 in the interior of the vehicle (based on data received by the receiver 16 resulting from signals transmitted by the vehicle-interior transmitters 14) the smart entry operation control ECU 10 applies control whereby the engine ECU 24 establishes the engine starting stand-by condition. When the door ECU 20 and the trunk ECU 22 are each set in the unlock stand-by condition, then a user can open the driver-side door and/or the trunk lid, by performing an appropriate opening operation. When this occurs, it is detected by an opening detection switch (not shown in the drawings) being closed, whereupon unlocking control is applied whereby the driver-side door and/or trunk lid is automatically released.

When the engine ECU 24 is set in the engine stand-by condition by the smart entry operation control ECU 10, then when the user (i.e., in this case, the driver) actuates a specific switch (not shown in the drawings) the engine ECU 24 applies engine start-up control, for automatically starting the vehicle engine.

Thus, with this embodiment of a smart entry system, when the host vehicle is in a parked condition and a user wishes to enter the vehicle or to place luggage in the vehicle trunk, it is not necessary for the user to perform any special operations (e.g., inserting and rotating a mechanical key in a conventional type of lock). Furthermore when the user wishes to start the host vehicle engine, it is not necessary for the user to insert and rotate an ignition key. Instead, the user need only perform a simple switch actuation.

Figure 3:
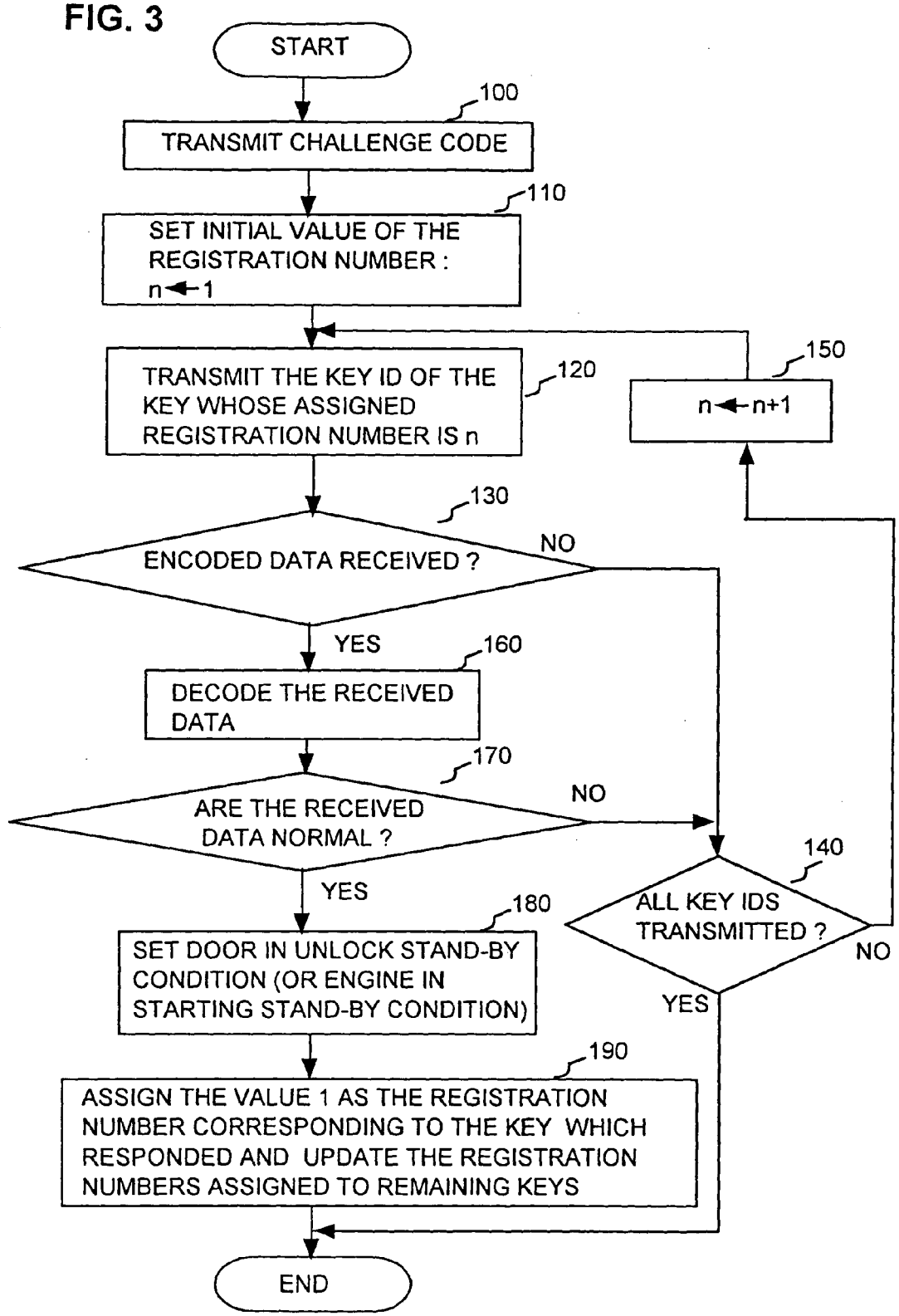
FIG. 3 is a flow diagram for describing electronic key detection processing which is executed by a smart entry control ECU of the embodiment.
Figure 4:
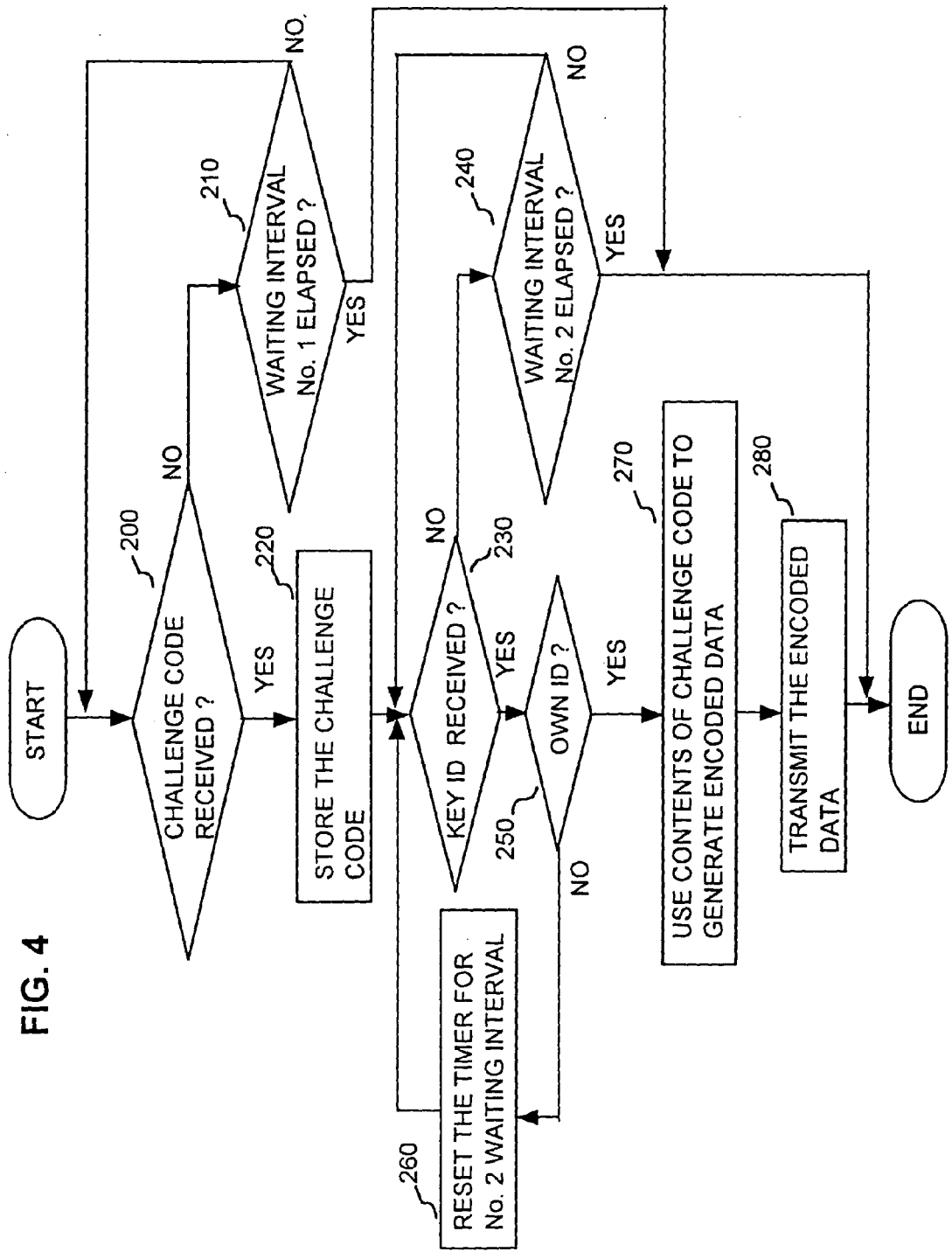
FIG. 4 is a flow diagram for describing response processing that is executed by an electronic key of the embodiment.

FIG. 3 is a flow diagram showing a key detection processing routine that is periodically executed by the smart entry operation control ECU 10 (more specifically, by a CPU within the smart entry operation control ECU 10) when the host vehicle is in a parked condition and it is detected that an electronic key 4 is within the interior of the vehicle or is close to the exterior of the vehicle. FIG. 4 is a flow diagram of the response processing that is executed by the CPU of an electronic key 4 in response to the detection processing that is shown in FIG. 3.

Firstly, assuming that a plurality of electronic keys 4 have been assigned to the host vehicle, a corresponding plurality of respectively different key ID codes (each formed of a fixed plurality of bits, e.g., 4 bits) expressing respective key IDs of the plurality of electronic keys 4 have been stored beforehand in the RAM of the smart entry operation control ECU 10. Each of these key IDs is linked to a corresponding registration number n, whose value indicates the priority with which the key ID code will be transmitted when all of the key ID codes are next successively transmitted. Specifically, when the smart entry operation control ECU 10 next performs a detection processing operation, the key ID codes are sequentially read out from the RAM of the smart entry operation control ECU 10 in order of the respective registration numbers n of the key ids, and are transmitted by the vehicle-mounted control apparatus 2 in that sequence.

The smart entry operation control ECU 10 executes the electronic key detection processing of FIG. 3 periodically, with a fixed period. Firstly in step 100, an activation signal for activating any electronic keys 4 in the vicinity of the host vehicle or in the interior of the host vehicle, and a challenge code, are successively supplied to each of the vehicle-exterior transmitters 12 and vehicle-interior transmitters 14 to be transmitted therefrom. The challenge code is a variable code which is used as an encoding key, and consists of a plurality of bits (e.g., 32 bits) whose number is greater than the number of bits constituting a key ID code. With the present invention, the challenge code constitutes the calling code that is transmitted from the host vehicle. Each combination of the activation signal and challenge code is transmitted as a burst of binary-modulated radio waves, and serves to notify any electronic key 4 which is in the vicinity of the host vehicle or in the interior of the host vehicle to activate the transmit/receive control ECU 30 of that electronic key 4, and begin communication with the vehicle-mounted control apparatus 2 of the host vehicle.

Next in step 110, the registration number n specifying the key ID whose code is to be transmitted at this time is set as 1, and in step 120 the key ID code corresponding to that value of registration number is read out and supplied to each of the vehicle-exterior transmitters 12 and vehicle-interior transmitters 14, and transmitted thereby. If there is an electronic key 4 within a communication region of the host vehicle that is assigned the transmitted key ID code, then response processing is executed by the transmit/receive control ECU 30 of that key (as described hereinafter) whereby that electronic key 4 uses the encoding key contained in the challenge code in conjunction with data that are specific to that electronic key 4, to transmit encoded data to the vehicle-mounted control apparatus 2.

Next, in step 130, a decision is made as to whether or not a receiver 16 has received encoded data that have been transmitted from an electronic key 4. If no encoded data have been received, then processing proceeds to step S104, in which a decision is made as to whether or not all of the key ID codes stored in the RAM of the smart entry operation control ECU 10 have been transmitted. If these have not all been transmitted, then processing proceeds to step 150, in which the value of the registration number n (for specifying the next key ID code that is to be transmitted) is incremented by 1, then the processing returns to step 120.

However if it is found in step 130 that encoded data have been received, then processing proceeds to step 160, in which the received encoded data are decoded by using, as a decoding key, the contents of the challenge code that was transmitted in step 100. Next in step 170, the contents of the decoded data obtained in step 160 are judged to determine whether or not these data are from an electronic key 4 which is appropriately assigned to the host vehicle. Thus judgement also serves to determine whether or not the received data have been correctly decoded.

If it is found that the decoded data are not from an electronic key 4 that is appropriately assigned to the host vehicle (or have not been correctly decoded) then processing proceeds to the aforementioned step 140, while otherwise, processing advances to step 180. In step 180, the door ECU 20 and the trunk ECU 22 are each controlled to establish the unlock stand-by condition, or the engine ECU 24 is set in the engine starting stand-by condition (i.e., if the vehicle is parked, with a door unlocked, as described above).

Processing then proceeds to step 190, in which the key ID code of the electronic key 4 which transmitted the encoded response data is set as the key ID code which will be transmitted first, the next time that this electronic key detection processing routine is executed. This is done by updating the respective values of registration number n which are assigned to the various key IDs, such that a value of 1 is set for the registration number of the key ID code of the electronic key 4 which transmitted the encoded response data which were decoded in this execution of the electronic key detection processing routine.

FIG. 4 is a flow diagram of a response processing routine that is executed by an electronic key 4 when responding to signals transmitted from the host vehicle in an execution of the electronic key detection processing routine described above. When the receiving section 32 of an electronic key 4 receives the aforementioned activation signal, the transmit/receive control ECU 30 of that electronic key 4 is activated, and the following response processing routine is then executed by that transmit/receive control ECU 30.

When execution of that response processing routine is started, then firstly after a step (not shown in the drawing) of initiating the operation of a timer which defines the duration of a first waiting interval, step 200 is executed to judge whether or not the correct challenge code has been received. If it has not been received, then operation proceeds to step 210 in which a decision is made as to whether or not the first waiting interval has elapsed, i.e., an interval in which the system waits to receive the challenge code. If the first waiting interval has not yet elapsed, then operation returns to step 200. However if it is found in step 210 that the first waiting interval has elapsed, then this is taken to signify that the correct challenge code has not been received from the host vehicle, i.e., that activation of the transmit/receive control ECU 30 has been caused by a factor such as electrical noise, or defective operation of the electronic key 4, and processing then is terminated.

If it is found in step 200 that the challenge code has been received, then operation proceeds to step 220 in which the received challenge code is stored in the RAM of the transmit/receive control ECU 30, then after a step (not shown in the drawing) of initiating the operation of a timer which defines the duration of a second waiting interval, step 230 is executed in which a decision is made as to whether or not a key ID code has been received, following the challenge code. If no key ID code has been received, then operation proceeds to step 240 in which a decision is made as to whether or not the second waiting interval has elapsed. If the second waiting interval has not yet elapsed, then operation returns to step 230. In that way, a wait is performed until a key ID code is received. However if it is found in step 240 that the second waiting interval has elapsed, then this is taken to indicate that data have not been received correctly from the vehicle-mounted control apparatus 2, or that the individual who is carrying this electronic key 4 has moved out of a communication area of the host vehicle. In that case, processing is ended.

However if it is found in step 230 that the challenge code has been received, then operation proceeds to step 250. In step 250 a decision is made as to whether or not the key ID code that has been received is that which has been assigned to this electronic key 4. If the received key ID code is not the one which has been assigned to this electronic key 4, then step 260 is executed, to reset the aforementioned timer of the second waiting interval and thereby re-start the second waiting interval. Processing then returns to step 230.

If it is found in step 250 that the most recently received key ID code is that which has been assigned to this electronic key 4, then since this signifies that the vehicle-mounted control apparatus 2 is requesting that response data be transmitted from this electronic key 4, step 270 is executed. In step 270, the challenge code which was stored in step 220 is read out from the RAM of the transmit/receive control ECU 30 together with predetermined response data, and the response data are encoded by using the contents of the challenge code as an encoding key.

The response data are preferably specific to each of the respective electronic keys 4. For example, the response data may consist of the key ID code of that key, combined with one or more status bits whose respective states provide an indication of the operating status of that electronic key 4.

Next, step 280 is executed, in which the encoded response data are transmitted as a binary signal by the transmitting section 34. This completes the processing routine.

Thus with this embodiment, when the host vehicle is in a parked condition, the smart entry operation control ECU 10 of the vehicle-mounted control apparatus 2 of the host vehicle periodically executes the key detection processing routine described above referring to FIG. 3, whereby the challenge code and the key ID codes of the respective electronic keys 4 which are assigned to the host vehicle are successively transmitted in communication regions around the exterior and within the interior (i.e., passenger compartment) of the host vehicle. When resultant encoded response data are received from an electronic key 4, the vehicle-mounted control apparatus 2 decodes the received data and judges whether the response data have been correctly received from an electronic key 4 which is assigned to the host vehicle. If so, then the vehicle-mounted control apparatus 2 controls the door ECU 20 and trunk ECU 22 to each establish the door unlock stand-by condition, and controls the engine ECU 24 to establish the engine starting stand-by condition.

Thus, with this embodiment of a smart entry system, even if there are a plurality of electronic keys 4 that are concurrently located within the communication regions of the host vehicle, there is no possibility that encoded response data from a plurality of the electronic keys 4 will be transmitted concurrently. That is to say, it is ensured that each time the vehicle-mounted control apparatus 2 executes the key detection processing routine shown in FIG. 3, encoded response data will be received from only a single electronic key 4, so that it is ensured that the smart entry operation control ECU 10 can reliably decode the received response data.

Hence with this embodiment, a condition can be avoided whereby such encoded response data are transmitted simultaneously from a plurality of electronic keys 4, thereby making it impossible for the controlled devices such as door locks and engine starter to be set in a stand-by status.

Furthermore with this embodiment, the key ID codes for the electronic keys 4 assigned to the host vehicle are stored in the RAM of the smart entry operation control ECU 10 in correspondence with respective values of registration number n, with these values determining the order in which the key ID codes are sequentially transmitted (i.e., in successive repetitions of step 120 of the flow diagram of FIG. 3) following the challenge code, as described hereinabove. Each time that response data are received from an electronic key 4, the key ID code of that key is then stored in RAM (i.e., in step 190 of the flow diagram of FIG. 3) in correspondence with a registration number value which specifies that this key ID code is to be transmitted first, when the key detection processing routine is next executed.

Figure 5A:
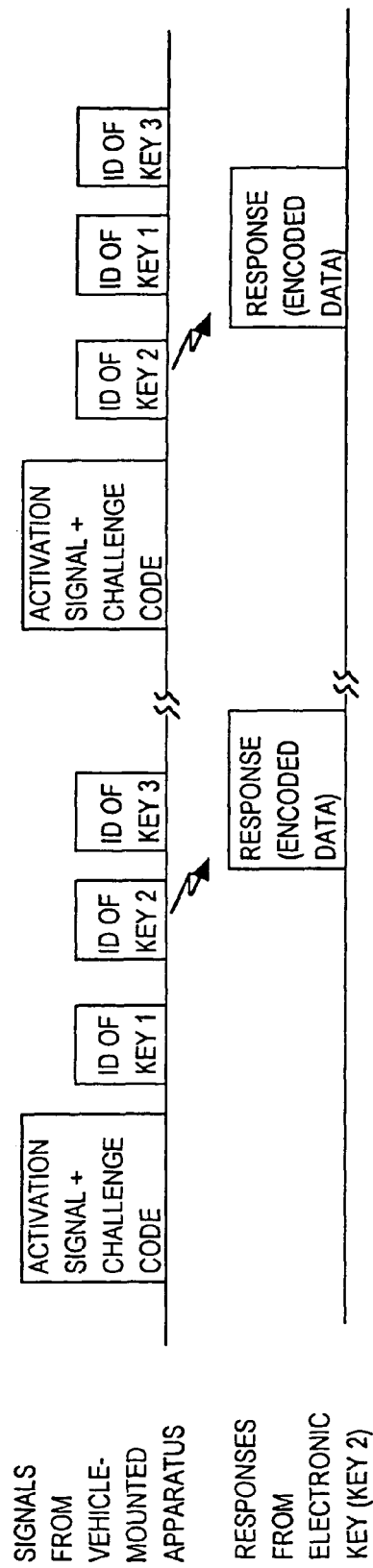
FIG. 5A is a conceptual timing diagram for illustrating communication between a vehicle-mounted control apparatus of the embodiment and electronic keys.

This is illustrated in FIG. 5A, which shows an example of two successive occurrences of signal transmissions by the vehicle-mounted control apparatus 2, during two successive executions of the processing routine of FIG. 3. In the first occurrence, the key ID codes for the electronic keys designated as key 1, key 2 and key 3 are successively transmitted following the challenge code, and in this case, key 2 transmits encoded response data when the ID code for that key has been transmitted. As a result, in the next occurrence of the signal transmissions by the vehicle-mounted control apparatus 2, the key ID codes are transmitted in the order of the codes for key 2, key 1 and key 3.

Thus in this case, since the user of key 2 has effected control of the host vehicle, there is a high probability that the same user will be the next person to effect control of the vehicle. Hence with the present invention, due to the updating of the registration numbers corresponding to the respective key ID codes that is performed in step 190 of FIG. 3, there is a high probability that an electronic key 4 which is within a communication region of the host vehicle and is held by an individual who wishes to control the vehicle will be rapidly detected, and the controls of the vehicle rapidly changed over to a stand-by condition. Hence, increased speed of control response can be achieved.

Furthermore with this embodiment, when the vehicle-mounted control apparatus 2 performs calling of electronic keys 4, the challenge code which conveys the encoding key is transmitted first. Thus when an electronic key 4 is to transmit response data, these data can be transmitted after having been encoded using the encoding key conveyed by the challenge code, i.e., an encoding key that is periodically varied by the vehicle-mounted control apparatus of the host vehicle, and so is inherently specific to the host vehicle. In addition, the response data which are encoded by an electronic key 4 are specific to that particular key.

Thus when the vehicle-mounted control apparatus 2 receives the encoded response data and performs decoding by using the same encoding key as that conveyed by the challenge code, the vehicle-mounted control apparatus 2 can immediately determine, based on the results of the decoding, whether or not the response data have been transmitted from an appropriate electronic key 4, i.e., from a key 4 that is assigned to a valid user of the host vehicle, with no possibility that the received encoded response data are data that have been stolen beforehand for the purpose of unauthorized entry to the host vehicle.

That is to say, with such a system, even if the code transmitted by the vehicle-mounted control apparatus 2 were to be stolen, or the encoded response data transmitted from an electronic key 4 were to be stolen, it is ensured that such stolen information could not be applied for unauthorized use of the host vehicle. Hence, increased security is achieved for the host vehicle.

Figure 5B:
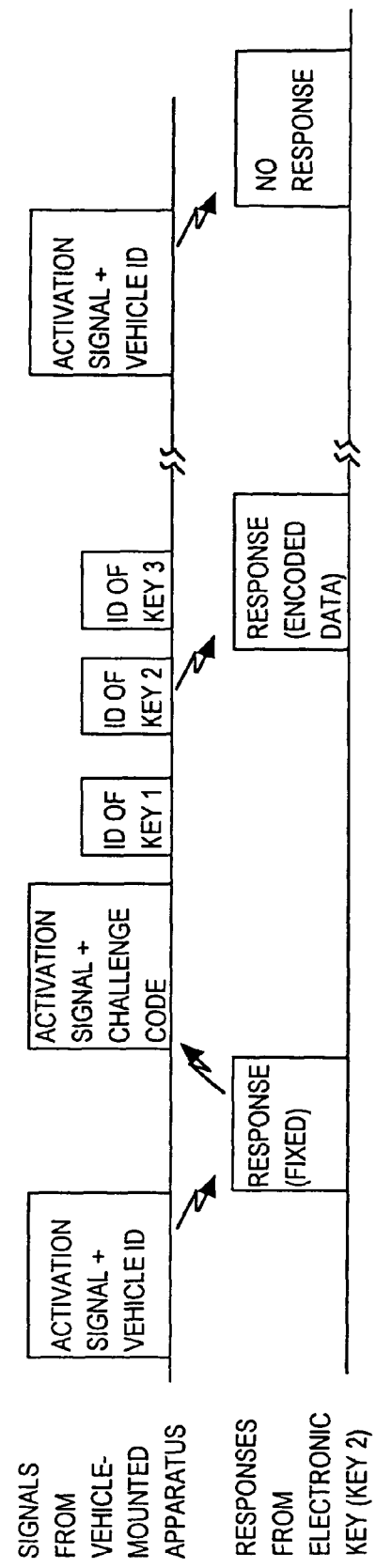
FIG. 5B is a corresponding diagram for the case of an alternative configuration of the embodiment.

It should be noted that the invention is not limited to the above embodiment. For example, with the above embodiment, when the vehicle-mounted control apparatus 2 calls any electronic key 4 that may be within its communication regions, it transmits the activation signal, followed by the challenge code, and thereafter successively transmits the key ID codes of the respective electronic keys 4 which are assigned to the host vehicle. However if there are no electronic keys 4 within the communication regions of the host vehicle, it is a waste of the vehicle battery power to transmit all of the above data and codes. For that reason, an alternative configuration of the above embodiment can be utilized for reducing such power consumption, which would operate as illustrated conceptually in FIG. 5B. In this case, the vehicle-mounted control apparatus 2 periodically transmits the activation signal followed by an ID code that is specific to the host vehicle. The challenge code and the key ID codes are transmitted by the vehicle-mounted control apparatus 2 only if a response is obtained from one or more of the electronic keys 4 to a transmission of the activation signal and vehicle ID code.

Figure 7:
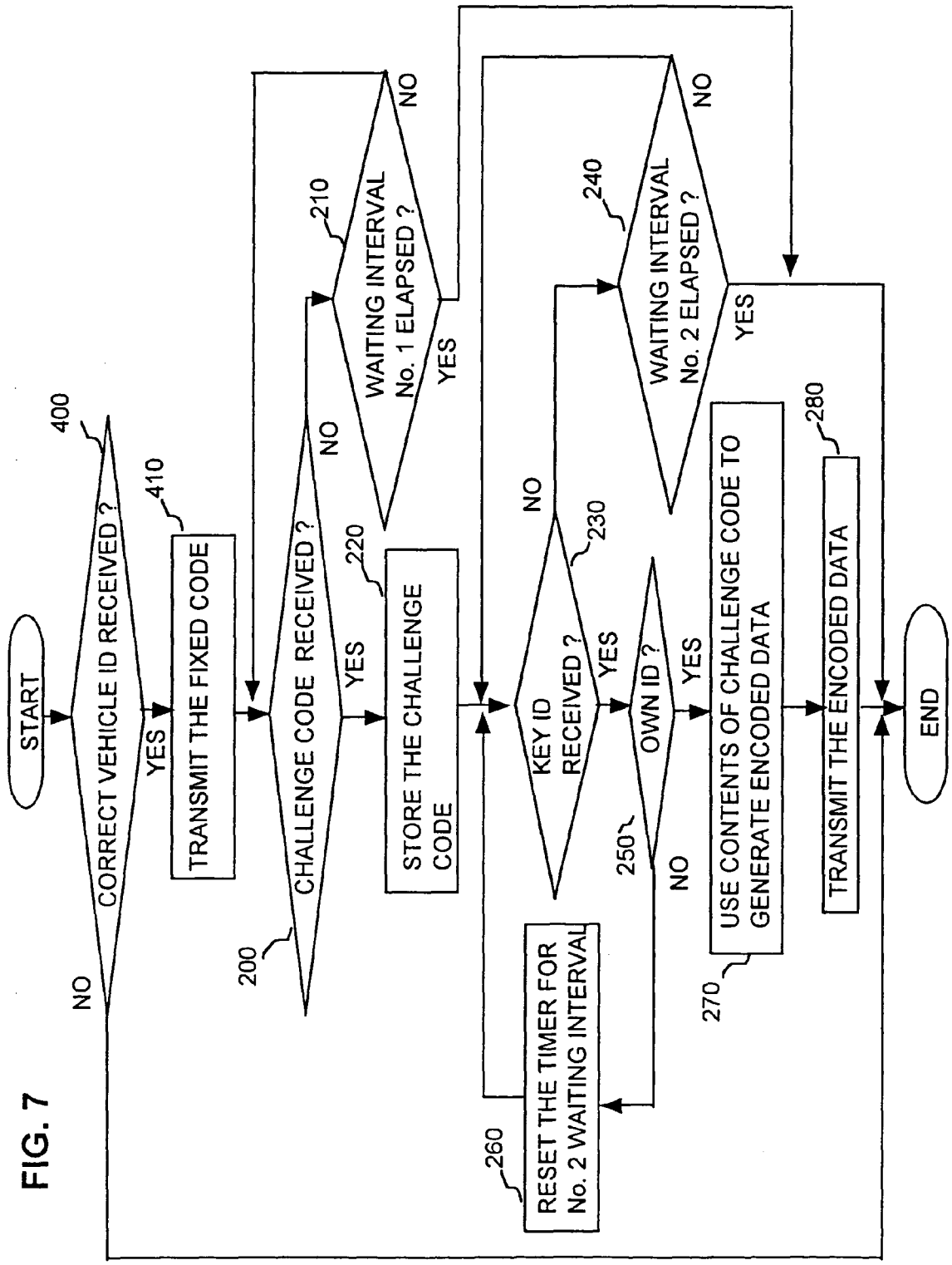
FIG. 7 is a flow diagram for describing response processing that is executed by an electronic key of the alternative configuration of the embodiment.

This operation can be implemented by modifying the detection processing that is executed by the smart entry operation control ECU 10 of the vehicle-mounted control apparatus 2 to become as shown in the flow diagram of FIG. 6, and modifying the response processing that is executed by the transmit/receive control ECU 30 of each electronic key 4 to become as shown in the flow diagram of FIG. 7. In the case of the flow diagram of FIG. 6, firstly in step 300, the smart entry operation control ECU 10 outputs the activation signal followed by the ID code of the host vehicle, to be transmitted by the vehicle-exterior transmitters 12 and vehicle-interior transmitters 14 to the communication regions of the host vehicle. The vehicle ID code can consist for example of approximately 12 bits. Next, in step 310, a decision is made as to whether or not a confirmation signal has been received from any of the electronic keys 4 in response to the transmitted activation signal and vehicle ID code. If no confirmation signal is received by the receiver 16, then processing is ended. If a confirmation signal is received, then in step 100 the challenge code and the key ID codes are successively transmitted by the vehicle-mounted control apparatus 2. The subsequent steps from step 110 onward are respectively identical to the corresponding steps in the flow diagram of FIG. 3 of the first embodiment described above.

With this modified embodiment, each of the electronic keys 4 assigned to a host vehicle has the vehicle ID code of that host vehicle stored beforehand, e.g., in the RAM of the transmit/receive control ECU 30. Referring to FIG. 7, when the transmit/receive control ECU 30 of an electronic key 4 receives the activation signal transmitted from the vehicle-mounted control apparatus 2, the transmit/receive control ECU 30 is thereby activated and begins the response processing routine. Firstly in step 400, the received vehicle ID code is compared with the stored vehicle ID code, to judge whether or not the activation signal has been received from the correct vehicle. If the stored vehicle ID code does not correspond to the received vehicle ID code, then processing is ended. If the stored vehicle ID code corresponds to the received vehicle ID code, then a fixed code (formed of a small number of bits, e.g., 4 bits), that is common to all of the electronic keys 4 which are assigned to the host vehicle and is specific to that set of electronic keys 4, is outputted by the transmit/receive control ECU 30 to the transmitting section 34, and is transmitted as the confirmation signal. The subsequent processing of still pictures 200 onward is identical to that of the corresponding steps in the processing routine of FIG. 4 of the first embodiment.

Thus in this case, by modifying the detection processing that is executed by the smart entry operation control ECU 10 of the vehicle-mounted control apparatus 2 and the response processing that is executed by the transmit/receive control ECU 30 of each electronic key 4, it is only necessary to transmit the activation signal and vehicle ID code in order to establish communication with any electronic key 4 which may be within the communication regions of the host vehicle. Thus, while the vehicle is in a condition in which there are no electronic keys 4 adjacent to the vehicle, the challenge code and key ID codes will not be successively transmitted by the vehicle-mounted control apparatus 2. Hence, the amount of load imposed on the host vehicle battery can be significantly reduced.

In the above description it is assumed that when an electronic key 4 receives the activation signal and vehicle ID code, and then transmits the confirmation signal, a code which is common to all of the electronic keys 4 assigned to the host vehicle is used by all of the electronic keys 4 to constitute the confirmation signal. This is to ensure that the vehicle-mounted control apparatus 2 will not begin to transmit the challenge code and the key ID codes as a result of receiving electrical noise, and also to ensure that when confirmation signals are received from a plurality of electronic keys 4 simultaneously, these confirmation signals will be reliably received by the vehicle-mounted control apparatus 2. Furthermore if the code used as the confirmation signal is made specific to the electronic keys 4 which are assigned to the host vehicle, it is ensured that the challenge code and key ID codes will not be erroneously transmitted by the vehicle-mounted control apparatus 2 due to reception of signals transmitted from other electronic keys, etc.

In the above description it is assumed that the key detection processing routine for calling the electronic keys is executed by the vehicle-mounted control apparatus 2 at fixed periodic intervals. However if there are no electronic keys 4 within the communication regions of the host vehicle, the electrical power which is used to transmit signals during each of these executions of the calling routine is wasted. As a measure to reduce the level of drain on the vehicle battery when the host vehicle is to be left parked for a long period of time, an alternative configuration of the above embodiment can be utilized, which incorporates an operating switch that can be actuated by a user, such that executions of the key detection processing routine are started only after that operating key is actuated. Specifically, the operating switch can be configured such as to supply a signal constituting a start command to the smart control operation ECU 10 when the switch is actuated, whereby the vehicle-mounted apparatus begins to execute the key detection processing routine and transmit the calling code at periodic intervals. In that way, a user can omit actuating the operating switch (after the vehicle engine has been halted) if the vehicle is to be left parked for a long period of time. With such a system, it can of course be arranged that the executions of the key detection processing routine and transmissions of the calling code are immediately halted when engine starting is performed.

Alternatively, the system can be configured such that the smart entry operation control ECU 10 of the vehicle-mounted control apparatus 2 performs an execution (or a fixed number of successive executions) of the key detection processing routine only when an attempt is made to open a door of the host vehicle, or when an attempt is made to actuate the engine starting switch. Alternatively, it is possible to configure the system such that the key detection processing routine is executed only when a part (e.g., door handle) of a door of the host vehicle is touched, or when the engine starting switch is touched.

In that way, it can be ensured that transmission of signals for electronic key detection is performed only when some person attempts to open a door of the host vehicle, or to start the vehicle engine. Thus, the level of power consumed from the vehicle battery as a result of operations for calling the electronic keys 4 can be very substantially reduced. There is thus a reduced risk of the battery becoming discharged, when the vehicle is left parked for a long period of time.

Similarly, if it is arranged that the detection processing shown in FIG. 6 is executed only when a person has attempted to actuate a door handle or the engine starting switch (or when a person has touched either of these), the level of battery power consumption can be further reduced.

Such a type of function can be implemented by providing actuation detection switches on one or more of the door handles of the host vehicle and on the trunk lid handle, i.e., on an actuation portion of each controlled device, with each of these switches adapted to generate a detection signal when a person attempts to perform an opening operation. These detection signals can be supplied directly to the smart entry operation control ECU 10 of the vehicle-mounted control apparatus 2, or could be supplied indirectly via the door ECU 20 and the trunk ECU 22 to the smart entry operation control ECU 10. In addition, the engine starting switch can be configured to generate a detection signal when it is manually actuated, with that detection signal being supplied directly to the smart entry operation control ECU 10, or supplied indirectly via the engine ECU 24 to the smart entry operation control ECU 10. In that way the smart entry operation control ECU 10 can be notified of an attempts to actuate a controlled device of the vehicle, and can respond by executing the key detection processing routine of FIG. 3 or FIG. 6.

Alternatively, touch-sensitive switch elements (touch sensors) could be utilized to generate such detection signals when a person touches a door handle or the trunk lid handle, or the engine starter switch. In that case, the touch sensors would be mounted on external surfaces of actuation portions of each controlled device (i.e., surfaces of door handles, and of an ignition switch lever or button). Detection signals produced from such touch sensors could be supplied directly to the smart entry operation control ECU 10, as indications of attempts to manually actuate the controlled devices of the vehicle.

In addition to the above, it should thus be understood that various other modifications to the described embodiments could be envisaged, which fall within the scope claimed for the present invention as set out in the appended claims.

What is claimed is:

1. A vehicle remote control system having a vehicle-mounted control apparatus which is mounted in a host vehicle, and a plurality of portable apparatuses each adapted to transmit response data which are specific to said each portable apparatus in response to reception of a calling code that is transmitted from said vehicle-mounted control apparatus, said vehicle-mounted control apparatus including communication means for executing wireless communication with any of said portable apparatuses which enter a communication region of said vehicle-mounted control apparatus and calling means for generating said calling code and supplying said calling code to said communication means to be transmitted thereby, and control means for performing control of at least one controlled device of said host vehicle in response to reception of said response data from one of said portable apparatuses, wherein said vehicle-mounted control apparatus comprises memory means having stored therein a plurality of ID (identifier) codes respectively assigned to said plurality of portable apparatuses and information specifying respective degrees of priority for said ID codes, said calling means and communication means transmit said calling code followed by each of said IID codes in succession, with said ID codes transmitted in order of said degrees of priority, each of said portable apparatuses is adapted to respond to reception of said calling code and the ID code which is specific to said each portable apparatus by transmitting said response data and, said control means of said vehicle-mounted control apparatus is responsive to reception of said response data from one of said portable apparatuses for updating said degrees of priority stored in said memory means such that said one of the portable apparatuses is assigned a highest one of said degrees of priority;

wherein
at least a part of said calling code is a variable code, and wherein each of said portable apparatuses performs encoding of said response data by using said variable code as an encoding key, before transmitting said response data, and wherein said control means performs decoding of said encoded response data when received by said communication means, using said variable code as a decoding key, and performs control of said controlled device and updating of said degrees of priority only when data resulting from said decoding are in accordance with predetermined conditions.

2. The vehicle remote control system according to claim 1, wherein said vehicle-mounted control apparatus comprises an operating switch actuatable for inputting a start command, and wherein said calling means is adapted to begin transmitting said calling code only after said start command has been inputted.

3. The vehicle remote control system according to claim 1, wherein said calling means is adapted to periodically supply said calling code to said communication means to be transmitted thereby, with a fixed repetition period.

4. The vehicle remote control system according to claim 1, wherein said control means of said vehicle-mounted control apparatus comprises actuation sensor means for detecting a condition indicative of an attempt to manually actuate said controlled device and for generating a detection signal when said condition is detected and supplying said detection signal to said calling means, and wherein said calling means is responsive to said detection signal for supplying said calling code and successive ID codes to said communication means to be transmitted thereby.

5. The vehicle remote control system according to claim 4, wherein said actuation sensor means comprises detection switch means coupled to an actuation portion of said controlled device.

6. The vehicle remote control system according to claim 4, wherein said actuation sensor means comprises touch sensor means disposed on an actuation portion of said controlled device.

7. The vehicle remote control system according to claim 1, wherein said calling means is adapted to transmit a predetermined signal via said communication means, as an activation signal, prior to transmitting said calling code, each of said portable apparatuses is adapted to respond to reception of said activation signal by transmitting a predetermined signal as a confirmation signal, and said calling means is adapted to respond to reception of said confirmation signal, received via said communication means, by supplying said calling code and successive ID codes to said communication means to be transmitted thereby.

8. The vehicle remote control system according to claim 7, wherein an identical predetermined signal is transmitted as said confirmation signal by all of said portable apparatuses.

9. The vehicle remote control system according to claim 7, wherein said confirmation signal is a fixed code.

10. The vehicle remote control system according to claim 7, wherein
said activation signal includes a vehicle ID code which is specific to said host vehicle, each of said portable apparatuses has said vehicle ID code fixedly stored beforehand in a memory thereof, and each of said portable apparatuses is adapted to compare a received vehicle ID code with said stored vehicle ID code, and to transmit said confirmation signal in response to said activation signal only when said received vehicle ID code corresponds to said stored vehicle ID code.

11. The vehicle remote control system according to claim 7, wherein said calling means is adapted to periodically supply said activation signal to said communication means to be transmitted thereby, with a fixed repetition period.

12. The vehicle remote control system according to claim 7, wherein said control means of said vehicle-mounted control apparatus comprises actuation sensor means for detecting a condition indicative of an attempt to manually actuate said controlled device and for generating a detection signal when said condition is detected and supplying said detection signal to said calling means, and wherein said calling means is responsive to said detection signal for supplying said activation signal to said communication means to be transmitted thereby.

13. The vehicle remote control system according to claim 12, wherein said actuation sensor means comprises detection switch means coupled to an actuation portion of said controlled device.

14. The vehicle remote control system according to claim 12, wherein said actuation sensor means comprises touch sensor means disposed on an actuation portion of said controlled device.

* * * * *